US010756778B1

(12) United States Patent
Collins (10) Patent No.: US 10,756,778 B1
(45) Date of Patent: Aug. 25, 2020

(54) SYSTEMS AND METHODS FOR SUBCARRIER SCAN (71) Applicant: VeEX Inc., Fremont, CA (US)

(72) Inventor: Michael Collins, Atlanta, GA (US)

(73) Assignee: VeEX Inc., Fremont, CA (US)

( * ) Notice: Subject to any disclaimer, the term of this patent is extended or adjusted under 35 U.S.C. 154(b) by 0 days.

(21) Appl. No.: 16/049,224

(22) Filed: Jul. 30, 2018

(51) Int. Cl.
H04B 3/46 (2015.01)

(52) U.S. Cl.
CPC .................................. H04B 3/46 (2013.01)

(58) Field of Classification Search
CPC ...... H04B 3/46; H04L 1/0668; H04L 27/2601
See application file for complete search history.

(56) References Cited

U.S. PATENT DOCUMENTS

| 5,999,193 | A | * | 12/1999 | Conley, Jr. | ............ | G06T 11/206 |
| | | | | | | 345/440 |
| 2002/0057661 | A1 | * | 5/2002 | Raith | ................ | H04B 7/2628 |
| | | | | | | 370/337 |
| 2004/0073664 | A1 | * | 4/2004 | Bestermann | ............ | H04L 43/00 |
| | | | | | | 709/224 |
| 2006/0181700 | A1 | * | 8/2006 | Andrews | ................ | G01N 21/21 |
| | | | | | | 356/237.2 |
| 2008/0039905 | A1 | * | 2/2008 | Tomescu | ................ | A61N 1/32 |
| | | | | | | 607/66 |
| 2009/0154369 | A1 | * | 6/2009 | Helvig | ................ | H04L 12/2801 |
| | | | | | | 370/252 |
| 2014/0133494 | A1 | * | 5/2014 | Liang | ................ | H04W 72/02 |
| | | | | | | 370/432 |
| 2015/0188668 | A1 | * | 7/2015 | Al-Banna | ............ | H04L 1/0668 |
| | | | | | | 370/208 |
| 2016/0299958 | A1 | * | 10/2016 | Kumar | ................ | G06F 16/9024 |
| 2018/0262412 | A1 | * | 9/2018 | Hanks | ................ | H04L 43/0847 |

* cited by examiner

Primary Examiner — Janice N Tieu
(74) Attorney, Agent, or Firm — Sheppard Mullin Richter & Hampton LLP (57) ABSTRACT Systems, methods, and non-transitory computer readable media are configured to determine data for subcarriers of a cable modem signal. Values which characterize the cable modem signal can be generated. A plot can then be generated. The plot can depict one or more of the values which characterize the cable modem signal.

19 Claims, 7 Drawing Sheets

SYSTEMS AND METHODS FOR SUBCARRIER SCAN

FIELD OF THE INVENTION

The present technology relates to the field of characterizing signals. More particularly, the present technology relates to techniques for characterizing subcarriers of an orthogonal frequency-division multiplexing signal.

BACKGROUND

Homes and businesses have become increasingly reliant on high-speed access to the Internet. For example, in the past, many homes and businesses used one connection for voice/data connectivity, and another connection for reception of audio/video entertainment. Many of these homes and businesses now use a single high-speed Internet connection for all of these needs. A common way of providing a high-speed Internet connection to a home or business is by using a cable modem.

SUMMARY

Various embodiments of the present technology can include systems, methods, and non-transitory computer readable media configured to determine data for subcarriers of a cable modem signal. Values which characterize the cable modem signal can be generated. A plot can then be generated. The plot can depict one or more of the values which characterize the cable modem signal.

In an embodiment, the cable modem signal can be an orthogonal frequency-division multiplexing signal.

In an embodiment, the plot can be an overview plot. Further, a request for a zoom plot can be received. The request for the zoom plot can specify a frequency range. Also, the zoom plot can be generated. The zoom plot can provide a zoom of the specified frequency range.

In an embodiment, the generating the values which characterize the cable modem signal can comprise generating one or more signal power values.

In an embodiment, the data for the subcarriers of the cable modem signal can comprise one or more in-phase values and one or more quadrature values. Further, the generating the one or more signal power values can comprise using the in-phase values and the quadrature values.

In an embodiment, the generating the values which characterize the cable modem signal can comprise generating one or more modulation error ratio values.

In an embodiment, the generating the values which characterize the cable modem signal can comprise generating one or more noise power values.

In an embodiment, the generating the plot can comprise placing one or more bars. Each bar can correspond to one of a 6 MHz block or a subcarrier.

In an embodiment, one or more of the bars can be set to have one or more colors. The one or more colors can indicate bit loading profiles.

In an embodiment, a selection of one of the bars can be determined. Further, information regarding the selected bar can be displayed.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Subcarrier Scan

Homes and businesses have become increasingly reliant on high-speed access to the Internet. For example, in the past, many homes and businesses used one connection for voice/data connectivity, and another connection for reception of audio/video entertainment. Many of these homes and businesses now use a single high-speed Internet connection for all of these needs. A common way of providing a high-speed Internet connection to a home or business is by using a cable modem.

Using a cable modem to provide high-speed Internet access provides many benefits such as low cost and the ability to use existing cable television infrastructure. However, installation of a cable modem at a home or business can be difficult. Various problems, including flaws in on-premises wiring, can lead to distortions in signals received by and transmitted from the cable modem. These distortions can lead to slow Internet speeds. In severe cases, these distortions can lead to a loss of Internet connectivity. Cable modem installers often use meters as an aid in tracking down sources of signal distortions. However, these meters do not typically provide subcarrier-level information about Orthogonal Frequency-Division Multiplexing (OFDM) signals, such as those used by a Data Over Cable Service Interface Specification (DOCSIS) 3.1 cable modem. As such, a cable modem installer can be hindered in his or her ability to locate sources of signal distortions.

Due to these or other concerns, the aforementioned and other conventional approaches specifically arising in the realm of computer technology can be disadvantageous or problematic. Therefore, an improved approach can be beneficial for addressing or alleviating various drawbacks associated with conventional approaches. Based on computer technology, the present technology can generate values and plots which characterize an OFDM signal, such as a DOC- SIS 3.1 OFDM signal. The present technology can receive information regarding one or more subcarriers of an OFDM signal. The information can be received from a cable modem, such as a cable modem which is internal to an installer meter. Further, a request for an overview plot can be received. The request can specify that the overview plot be: 1) a signal power overview plot; 2) a MER overview plot; or 3) a noise power overview plot. The request can further specify a frequency range for the overview plot. Multiple values can be generated. The particular values which are generated can depend on the type of overview plot which has been requested. Further, the overview plot can be generated. The overview plot can depict various of the generated values. Also, a request for a zoom plot of the overview plot can be received. The request can specify a 6 megahertz-wide range. Further, a zoom plot of the overview plot can be generated. The zoom plot can correspond to the 6 megahertz-wide range. Although a 6 megahertz (MHz) frequency width and a 50 kilohertz (kHz) frequency width are sometimes referenced in relation to various examples discussed herein, the present technology applies equally to other frequency widths. Further details regarding the present technology are provided herein.

Figure 1:
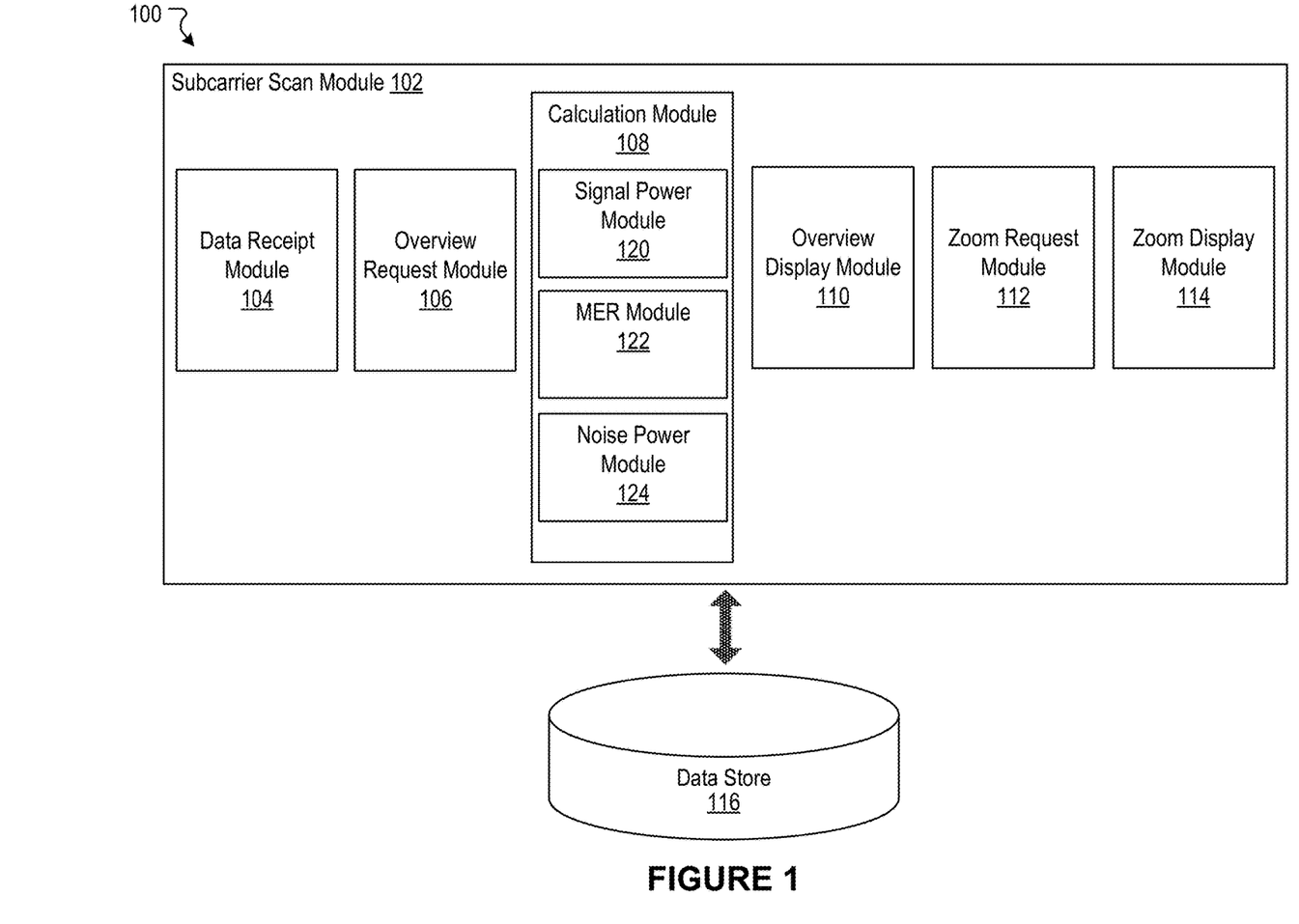
FIG. 1 illustrates an example system including a subcarrier scan module, according to an embodiment of the present technology.

FIG. 1 illustrates an example system 100 including an example subcarrier scan module 102, according to an embodiment of the present technology. As shown in the example of FIG. 1, the subcarrier scan module 102 can include a data receipt module 104, an overview request module 106, a calculation module 108, an overview display module 110, a zoom request module 112, and a zoom display module 114. In some instances, the example system 100 can include at least one data store 116. The components (e.g., modules, elements, etc.) shown in this figure and all figures herein are exemplary only, and other implementations can include additional, fewer, integrated, or different components. Some components may not be shown so as not to obscure relevant details.

In some embodiments, the subcarrier scan module 102 can be implemented, in part or in whole, as software, hardware, or any combination thereof. In some cases, the subcarrier scan module 102 can be implemented, in part or in whole, as software running on one or more computing devices or systems. For example, the subcarrier scan module 102 or at least a portion thereof can be implemented as or within an application (e.g., app), a program, an applet, or an operating system, etc., running on a user computing device or a client computing system. In another example, the subcarrier scan module 102 or at least a portion thereof can be implemented using one or more computing devices or systems that include one or more computerized DOCSIS installer meters. In a further example, the subcarrier scan module 102 or at least a portion thereof can be implemented using one or more computing devices or systems that include one or more servers, such as network servers or cloud servers. The subcarrier scan module 102 or at least a portion thereof can be implemented using computer system 700 of FIG. 7. It should be understood that there can be many variations or other possibilities.

The subcarrier scan module 102 can be configured to communicate and/or operate with the at least one data store 116, as shown in the example system 100. The at least one data store 116 can be configured to store and maintain various types of data. For example, the data store 116 can store information used or generated by the subcarrier scan module 102. The information used or generated by the subcarrier scan module 102 can include, for example, cable modem data, calculation result data, and plot data.

The data receipt module 104 can receive data from a cable modem. As one example, the cable modem can be internal to a device upon which the subcarrier scan module 102 is operating. For instance, the device can be a computerized installer meter, and the cable modem can be implemented as a system-on-a-chip (SoC) which is internal to the installer meter. As another example, the cable modem can be external to the device upon which the subcarrier scan module 102 is operating. For instance, the cable modem can be a unit which is used to provide internet connectivity to a premises such as a home or a business. According to this example, the device upon which the subcarrier scan module 102 is operating can communicate with the cable modem via a connection such as Ethernet, Wi-Fi, or Bluetooth.

The data which is received from the cable modem can regard each of one or more subcarriers of an OFDM signal such as a DOCSIS 3.1 OFDM signal. In particular, specified for each of the subcarriers can be one or more of: 1) a frequency value; 2) an in-phase (I) value; 3) a quadrature (Q) value; 4) a raw noise power value; 5) an error margin value; and 6) a bit loading profile indicator. In some embodiments, the data which is received from the cable modem can include modulation error ratio (MER) values rather than error margin values. The subcarriers of the OFDM signal can include subcarriers which carry user data. The subcarriers of the OFDM signal can also include subcarriers which carry overhead data. The subcarriers which carry overhead data can include a Physical Link Control (PLC) subcarrier and one or more continuous pilot subcarriers. The PLC subcarrier can carry overhead data such as bootstrapping information. The one or more continuous pilot subcarriers can carry overhead data usable for frequency and phase synchronization. Where a subcarrier carries user data, a corresponding bit loading profile indicator can specify a modulation type such as 256-QAM (Quadrature Amplitude Modulation). Where a subcarrier carries overhead data, a corresponding bit loading profile indicator can specify PLC or continuous pilot. In some embodiments, the data which is received from the cable modem can specify information for one or more 6 MHz blocks of the OFDM signal. In particular, specified for each of the 6 MHz blocks can be one or more of a frequency value and a signal power level. The frequency value can indicate a start frequency or a central frequency of the 6 MHz block.

The overview request module 106 can receive a request for an overview plot. The request can be received from a user via a user interface of the device upon which the subcarrier scan module 102 is operating. The request can specify: 1) a signal power overview plot; 2) a MER overview plot; or 3) a noise power overview plot. The request can further specify a frequency range for the plot.

The calculation module 108 can include a signal power module 120, a MER module 122, and a noise power module 124. Where the request for the overview plot specifies a signal power overview plot, the calculation module 108 can use the signal power module 120. The signal power module 120 can first calculate a relative signal power level RelativeSignalPower$_{subcarrier}$ for each subcarrier subcarrier of the frequency range specified for the plot. RelativeSignalPower$_{subcarrier}$ can be calculated for a given subcarrier subcarrier using the equation:

$$\text{RelativeSignalPower}_{subcarrier} = 10 \cdot \log_{10}(I_{subcarrier}^2 + Q_{subcarrier}^2) \quad (1)$$

In the equation, $I_{subcarrier}$ can be an I value for the subcarrier subcarrier; $Q_{subcarrier}$ can be a Q value for the subcarrier subcarrier; and $I_{subcarrier}$ and $Q_{subcarrier}$ can be received from the cable modem as discussed above. $(I^2_{subcarrier}+Q^2_{subcarrier})$ of the equation can provide a raw signal power for the subcarrier subcarrier.

The signal power module 120 can also determine a highest value among the relative signal power levels calculated for the subcarriers. Further, the signal power module 120 can calculate a normalized signal power level NormSignalPower$_{subcarrier}$ for each subcarrier subcarrier of the frequency range specified for the plot. NormSignalPower$_{subcarrier}$ can be calculated for a given subcarrier subcarrier using the equation:

$$\text{NormSignalPower}_{subcarrier}=\text{RelativeSignalPower}_{subcarrier}-\text{RelativeSignalPower}_{high} \quad (2)$$

In the equation, RelativeSignalPower$_{subcarrier}$ can be the relative signal power which was calculated for the subcarrier subcarrier; and RelativeSignalPower$_{high}$ can be the determined highest value among the relative signal power levels calculated for the subcarriers.

Additionally, the signal power module 120 can calculate an average signal power level AverageSignalPower$_{block}$ for each 6 MHz block block of the frequency range specified for the plot. AverageSignalPower$_{block}$ can be calculated for a given 6 MHz block block as an average. In particular, the average can be an average of the relative signal power levels calculated for the subcarriers which comprise the 6 MHz block. In some embodiments, the information received from the cable modem can include signal power levels for 6 MHz blocks of the OFDM signal, as discussed. In these embodiments, the signal power module 120 can instead set AverageSignalPower$_{block}$ for each 6 MHz block block to the signal power level received from the cable modem for the 6 MHz block.

Where the request for the overview plot specifies a MER overview plot, the calculation module 108 can use the MER module 122. The MER module 122 can calculate a MER value MER$_{subcarrier}$ for each subcarrier subcarrier of the frequency range specified for the plot. MER$_{subcarrier}$ can be calculated for a given subcarrier subcarrier using the equation:

$$\text{MER}_{subcarrier}=\text{ErrorMargin}_{subcarrier}+\text{bitloadingOffset}_{subcarrier} \quad (3)$$

In the equation, ErrorMargin$_{subcarrier}$ can be an error margin value for the subcarrier subcarrier. ErrorMargin$_{subcarrier}$ can be received from the cable modem as discussed above. bitloadingOffset$_{subcarrier}$ can be an offset value which is selected based on a bit loading profile used by the subcarrier. An indication of the bit loading profile used by the subcarrier can be received from the cable modem as discussed above. In some embodiments, bitloadingOffset$_{subcarrier}$ can be selected according to the following scheme:

| Bit Loading Profile | Offset Value |
|---|---|
| PLC | 13.5 |
| continuous pilot | 13.5 |
| 16-QAM | 13.5 |
| 64-QAM | 18.4 |
| 128-QAM | 21.5 |
| 256-QAM | 23.5 |
| 512-QAM | 26.75 |
| 1k-QAM | 30.0 |
| 2k-QAM | 32.65 |
| 4k-QAM | 35.35 |

In other embodiments, a different scheme can be used. Further, in some embodiments, experimentation can be used in formulating offset values for the scheme which is used. Also, in some embodiments, the information received from the cable modem can include MER values rather than error margin values, as discussed. In these embodiments, the MER module 122 can instead set MER$_{subcarrier}$ for each subcarrier subcarrier to the MER value received from the cable modem for the subcarrier.

Where the request for the overview plot specifies a noise power overview plot, the calculation module 108 can use the noise power module 124. The noise power module 124 can first calculate a relative noise power level RelativeNoisePower$_{subcarrier}$ for each subcarrier subcarrier of the frequency range specified for the plot. RelativeNoisePower$_{subcarrier}$ can be calculated for a given subcarrier subcarrier using the equation:

$$\text{RelativeNoisePower}_{subcarrier}=10 \cdot \log_{10}(\text{RawNoisePower}_{subcarrier}) \quad (4)$$

In the equation, RawNoisePower$_{subcarrier}$ can be a raw noise power for the subcarrier subcarrier. RawNoisePower$_{subcarrier}$ can be received from the cable modem as discussed above. The noise power module 124 can also determine a lowest value among the relative noise power levels calculated for the subcarriers. Further, the noise power module 124 can calculate a normalized noise power level NormNoisePower$_{subcarrier}$ for each subcarrier subcarrier of the frequency range specified for the plot. NormNoisePower$_{subcarrier}$ can be calculated for a given subcarrier subcarrier using the equation:

$$\text{NormNoisePower}_{subcarrier}=\text{RelativeNoisePower}_{subcarrier}-\text{RelativeNoisePower}_{low} \quad (5)$$

In the equation, RelativeNoisePower$_{subcarrier}$ can be the relative noise power level which was calculated for the subcarrier subcarrier; and RelativeNoisePower$_{low}$ can be the determined lowest value among the relative noise power levels calculated for the subcarriers.

The overview display module 110 can use the user interface to display an overview plot to the user. Where the request specifies a signal power overview plot, the overview display module 110 can display one or more bars. Each bar can correspond to a 6 MHz block of the frequency range specified by the request. The overview display module 110 can set each bar to have a width that indicates 6 MHz according to a scale of an x-axis. The overview display module 110 can place each bar at a location on the x-axis which indicates frequencies occupied by the 6 MHz block. The overview display module 110 set each bar to have a height on a y-axis which indicates an average signal power calculated or set for the 6 MHz block. Further, the overview display module 110 can set each bar to have one or more colors. The one or more colors can indicate bit loading profiles used by the subcarriers which comprise the 6 MHz block. As one example, red can be used to indicate PLC. Further in this example, green can be used to indicate continuous pilot. Also in this example, blue can be used to indicate other than PLC and continuous pilot. As such, blue can indicate user data. Additionally, the overview display module 110 can, for example, set the x-axis to have tick values specified in MHz. Further, the overview display module 110 can, for example, set the y-axis to have tick values specified in decibels-per-millivolt (dBmV).

Where the request specifies a MER overview plot or a noise power overview plot, the overview display module 110 can also place one or more bars. Each bar can correspond to a subcarrier of the frequency range specified by the request. The overview display module 110 can set each bar to have a width that indicates 50 kHz according to the scale of an x-axis. The overview display module 110 can place each bar at a location on the x-axis which indicates frequencies occupied by the subcarrier. Where the request specifies a MER overview plot, the overview display module 110 can set each bar to have a height on a y-axis which indicates a MER value calculated or set for the subcarrier. Where the request specifies a noise power overview plot, the overview display module 110 can set each bar to have a height on the y-axis which indicates a normalized noise power level calculated for the subcarrier. Further, the overview display module 110 can set each bar to have a color. The color can indicate a bit loading profile used by the subcarrier. As one example, the color can be set as discussed. Additionally, the overview display module 110 can, for example, set the x-axis to have tick values specified in MHz. Further, the overview display module 110 can, for example, set the y-axis to have tick values specified in decibels (dB).

In some embodiments, a cursor of the user interface can be used by the user to select a bar. In response, the overview display module 110 can use the user interface to display various information about the selected bar to the user. The information can be displayed as text and digits. Where the displayed overview plot is a signal power overview plot, the information can include: 1) a start frequency or a central frequency for a 6 MHz block to which the selected bar corresponds; 2) one or more bit loading profiles used by subcarriers of the 6 MHz block; and 3) an average signal power calculated or set for the 6 MHz block. Where the displayed overview plot is a MER overview plot, the information can include: 1) a frequency for a subcarrier to which the selected bar corresponds; 2) a bit loading profile used by the subcarrier; and 3) a MER value calculated or set for the subcarrier. Where the displayed overview plot is a noise power overview plot, the information can include: 1) a frequency for a subcarrier to which the selected bar corresponds; 2) a bit loading profile used by the subcarrier; and 3) a normalized noise power level calculated for the subcarrier.

The zoom request module 112 can receive a request for a zoom plot. The zoom plot can provide a zoom of the displayed overview plot. The request can be received from the user via the user interface of the device. The request can specify a frequency range for the zoom plot. The frequency range can be 6 MHz wide. Where the displayed overview plot is a signal power overview plot, the user interface can allow selection of the frequency range by selection of one of the displayed bars. The frequency range can comprise the frequencies occupied by a 6 MHz block to which the bar corresponds. Where the displayed overview plot is a MER overview plot or a noise power overview plot, the user interface can allow selection of the frequency range by placement of a 6 MHz-wide marker. The frequency range can comprise the frequencies occupied by the 6 MHz-wide marker.

The zoom display module 114 can use the user interface to display a zoom plot of the displayed overview plot to the user. Where the displayed overview plot is a signal power overview plot, the zoom display module 114 can place one or more bars. In particular, the zoom display module 114 can place one or more bars generally as discussed in connection with signal power overview plot display. However, as a first difference, each bar can correspond to a subcarrier of a frequency range occupied by the 6 MHz block used to request the zoom plot. As a second difference, the zoom display module 114 can set each bar to have a width that indicates 50 kHz. As a third difference, the zoom display module 114 can set each bar to have a height on a y-axis which indicates a normalized signal power level calculated for the subcarrier of the bar. As a fourth difference, the zoom display module 114 can set a y-axis to have values specified, for example, in dB. As a fifth difference, one or more of the axes of the zoom plot can have a larger scale than the axes of the displayed overview plot. As such, the bars which depict subcarriers in the zoom plot can appear in the user interface to provide a zoom on the 6 MHZ block used to request the zoom plot.

Where the displayed overview plot is a MER overview plot or a noise power overview plot, the zoom display module 114 can also place one or more bars. In particular, the zoom display module 114 can place one or more bars generally as discussed in connection with MER overview plot display and noise power overview plot display. However, as a first difference, each bar can correspond to a subcarrier of a range occupied by the 6 MHz-wide marker used to request the zoom plot. As a second difference, one or more of the axes of the zoom plot can have a larger scale than the axes of the displayed overview plot. As such, the bars which depict subcarriers in the zoom plot can appear to provide a zoom of the range occupied by the 6 MHz-wide marker used to request the zoom plot.

In some embodiments, a cursor of the user interface can be used to select a bar. In response, the zoom display module 114 can use the user interface to display various information about the selected bar to the user. The information can be displayed as text and digits. The information can include: 1) a frequency for a subcarrier to which the selected bar corresponds; and 2) a bit loading profile used by the subcarrier. Further, where the zoom plot is a signal power zoom plot, the information can include a normalized signal power level calculated for the subcarrier. Also, where the zoom plot is a MER zoom plot, the information can include a MER value calculated or set for the subcarrier. Additionally, where the zoom plot is a noise power zoom plot, the information can include a normalized noise power level calculated for the subcarrier.

Figure 2:
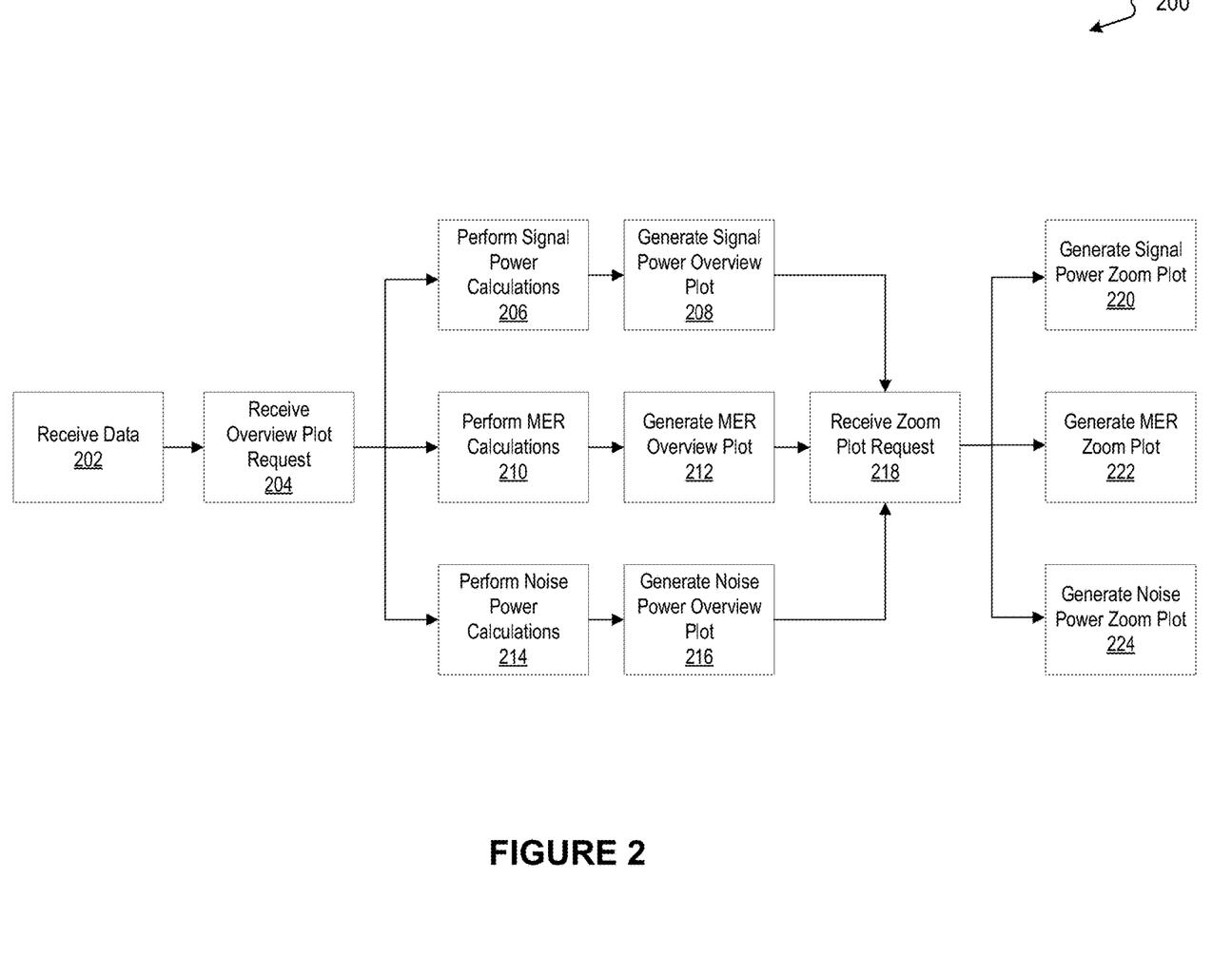
FIG. 2 illustrates an example functional block diagram, according to an embodiment of the present technology.

FIG. 2 illustrates an example functional block diagram 200, according to an embodiment of the present technology. The functional block diagram 200 illustrates an example of operation of the subcarrier scan module 102, as discussed in further detail above. Data from a cable modem can be received at block 202. The data can specify information for one or more subcarriers of an OFDM signal. At block 204, a request for an overview plot can be received. In particular, the request for the overview plot can be received from a user via a user interface. The request for the overview plot can specify: 1) a signal power overview plot; 2) a MER overview plot; or 3) a noise power overview plot. The request can also specify a frequency range for the overview plot. Where the request for the overview plot specifies a signal power overview plot, signal power calculations can be performed at block 206. Subsequently, a signal power overview plot for the frequency range can be generated at block 208. Where the request for the overview plot specifies a MER overview plot, MER calculations can be performed at block 210. Subsequently, a MER overview plot for the frequency range can be generated at block 212. Where the request for the overview plot specifies a noise power overview plot, noise power calculations can be performed at block 214. Subsequently, a noise power overview plot for the frequency range can be generated at block 216.

Further, at block 218, a request for a zoom plot of the overview plot can be received. In particular, the request for the zoom plot can be received from the user via the user interface. The request can specify a 6 MHz-wide range. Where the overview plot is a signal power overview plot, a signal power zoom plot can be generated at block 220. Where the overview plot is a MER overview plot, a MER zoom plot can be generated at block 222. Where the overview plot is a noise power overview plot, a noise power zoom plot can be generated at block 224. The generated zoom plot can correspond to the 6 MHz-wide range. As just one example, the overview plots and zoom plots can be used by a technician when installing a cable modem or when troubleshooting a cable modem.

Figure 3:
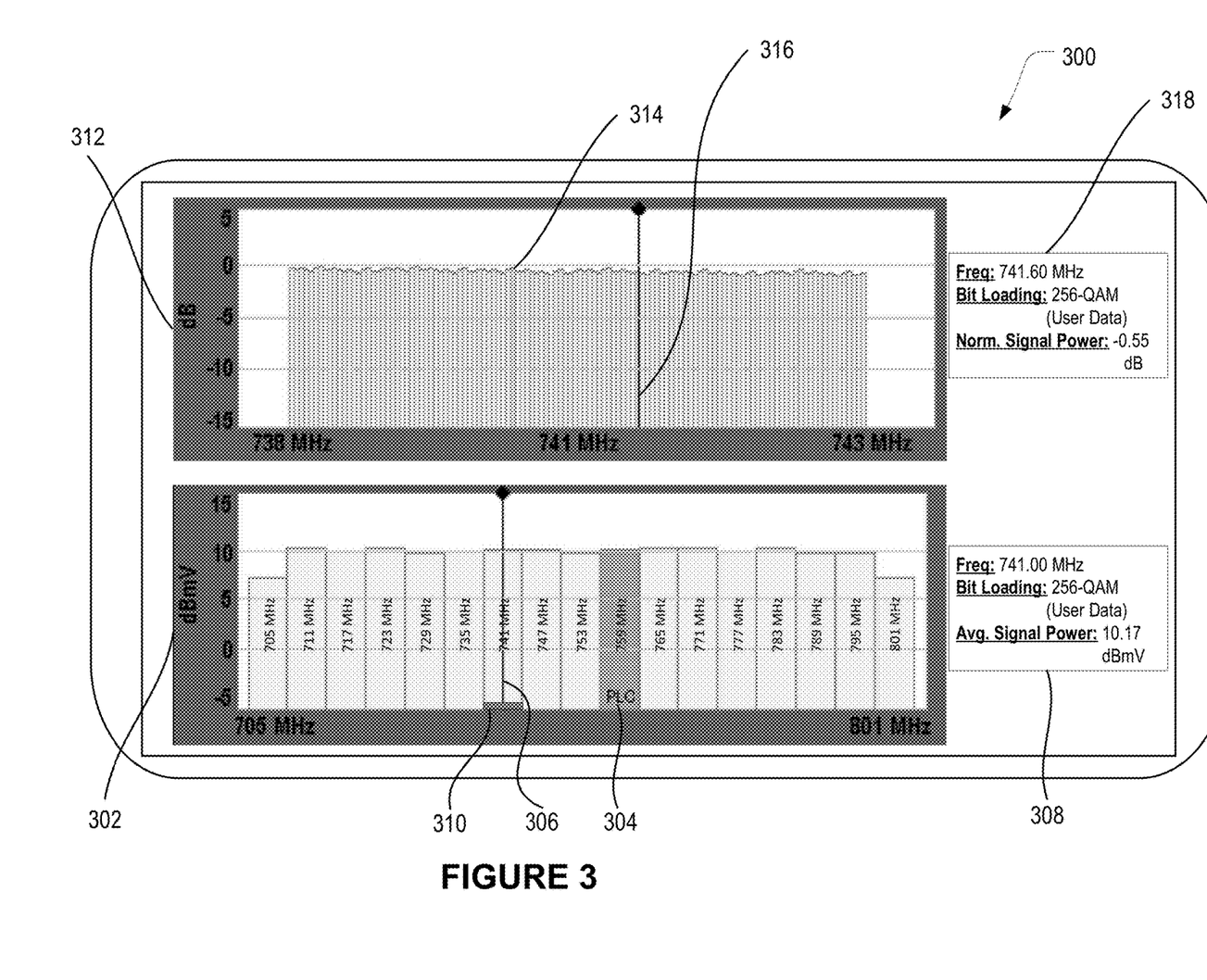
FIG. 3 illustrates an example scenario, according to an embodiment of the present technology.

FIG. 3 illustrates an example scenario supported by the subcarrier scan module 102, according to an embodiment of the present technology. According to the example scenario of FIG. 3, the subcarrier scan module 102 has performed one or more signal power calculations. Further, the subcarrier scan module 102 has displayed signal power overview plot 302 to a user. The signal power overview plot 302 includes multiple bars. A height of each bar indicates an average signal power calculated for the 6 MHz block to which the bar corresponds. Within the signal power overview plot 302, a bar 304 has been set to a color which indicates that the subcarriers of the 6 MHz block to which the bar corresponds are using a PLC bit loading profile. Other bars of the signal power overview plot 302 are each set to a different color. The different color indicates that the subcarriers of these bars use a bit loading profile for carrying user data. According to the example scenario of FIG. 3, a cursor 306 has been moved to a bar by the user. In response, the subcarrier scan module 102 has used the user interface 300 to display various information 308 about the selected bar to the user.

Further according to the example scenario of FIG. 3, a marker 310 has been used by the user to select a 6 MHz block. In response, the subcarrier scan module 102 has displayed a signal power zoom plot 312 to the user. The signal power zoom plot 312 includes multiple bars. A height of each bar indicates a normalized signal power level calculated for the subcarrier of the bar. Within the signal power zoom plot 312, a bar 314 has been set to a color which indicates that the subcarrier of the bar uses a continuous pilot bit loading profile. Other bars of the signal power zoom plot 312 have been set to a different color which indicates that the subcarriers of these bars use a bit loading profile for carrying user data. According to the example scenario of FIG. 3, a cursor 316 has been moved to a bar by the user. In response, the subcarrier scan module 102 has used the user interface 300 to display various information 318 about the selected bar to the user.

Figure 4:
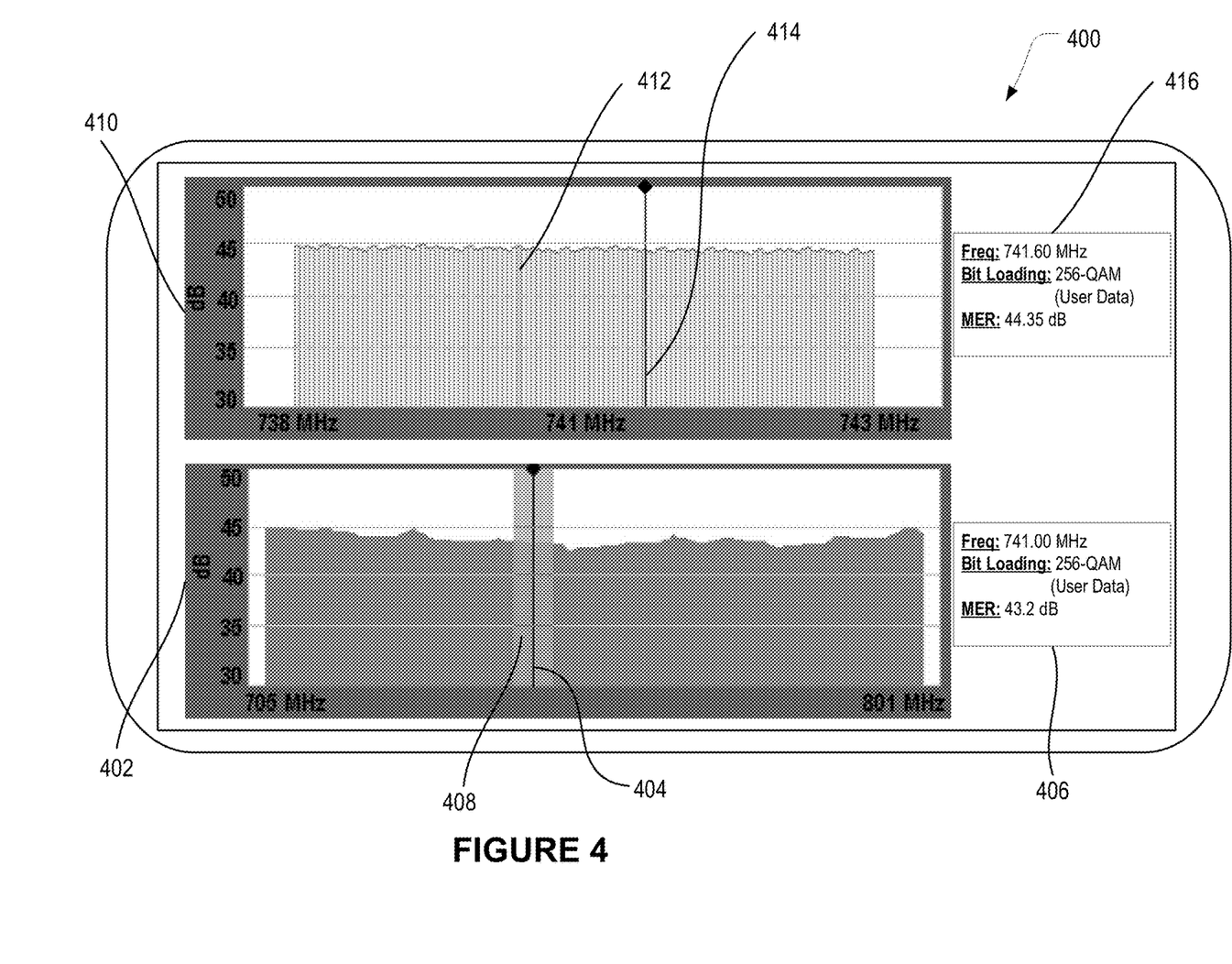
FIG. 4 illustrates a further example scenario, according to an embodiment of the present technology.

FIG. 4 illustrates a further example scenario supported by the subcarrier scan module 102, according to an embodiment of the present technology. According to the example scenario of FIG. 4, the subcarrier scan module 102 has performed one or more MER calculations. Further, the subcarrier scan module 102 has displayed MER overview plot 402 to a user. The MER overview plot 402 includes multiple bars. A height of each bar indicates a MER value calculated for the subcarrier to which the bar corresponds. Within the MER overview plot 402, all bars are set to a color which indicates that the subcarriers of the bars use a bit loading profile for carrying user data. According to the example scenario of FIG. 4, a cursor 404 has been moved to a bar by the user. In response, the subcarrier scan module 102 has used the user interface 400 to display various information 406 about the selected bar to the user.

Further according to the example scenario of FIG. 4, a 6 MHz-wide marker 408 has been used by the user to select a 6 MHz frequency range. In response, the subcarrier scan module 102 has displayed a MER zoom plot 410 to the user. The MER zoom plot 410 includes multiple bars. A height of each bar indicates a MER value calculated for the subcarrier of the bar. Within the MER zoom plot 410, a bar 412 has been set to a color which indicates that the subcarrier of the bar uses a continuous pilot bit loading profile. Other bars of the MER zoom plot 410 have been set to a different color which indicates that the subcarriers of these bars use a bit loading profile for carrying user data. According to the example scenario of FIG. 4, a cursor 414 has been moved to a bar by the user. In response, the subcarrier scan module 102 can have used the user interface 400 to display various information 416 about the selected bar to the user.

Figure 5:
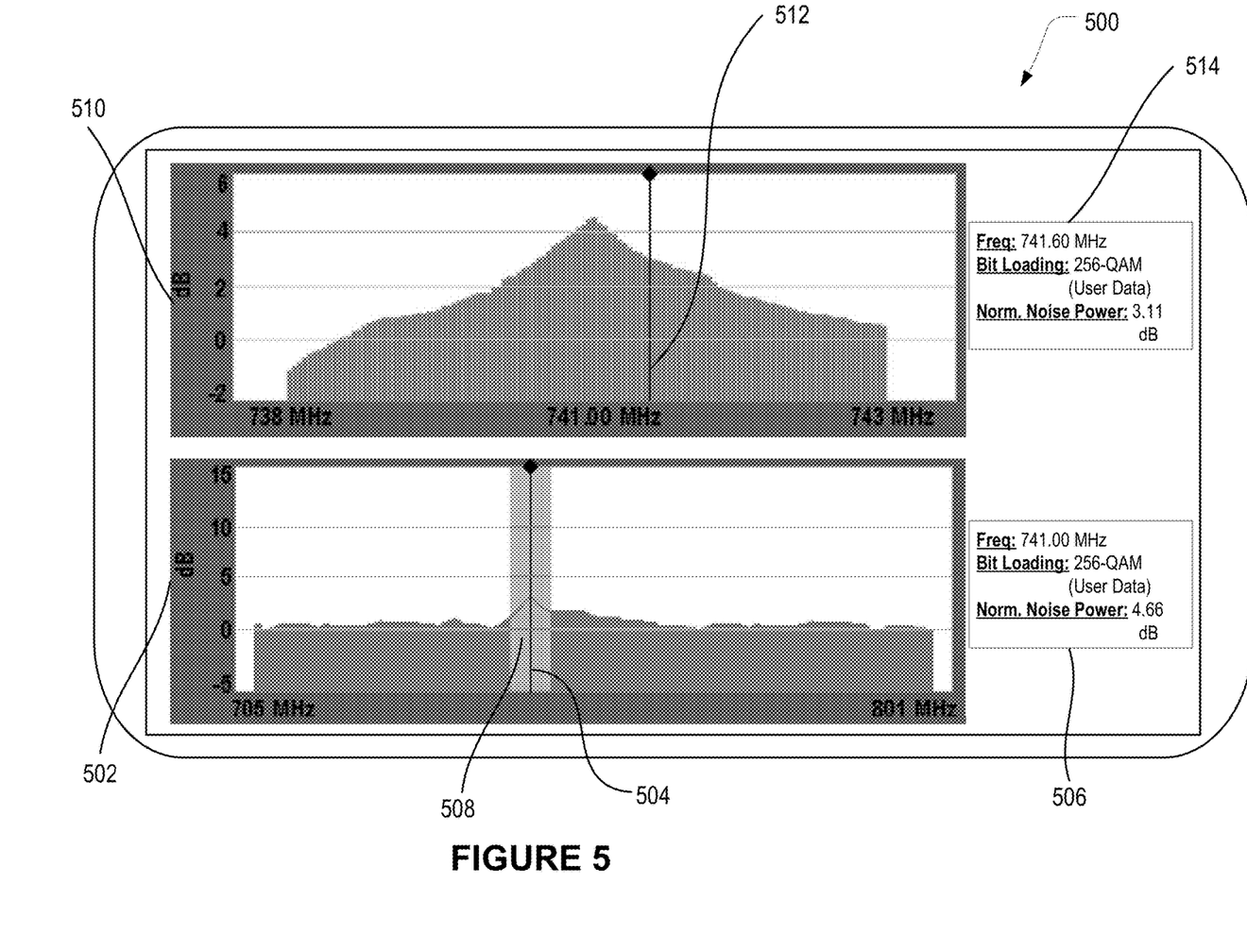
FIG. 5 illustrates another example scenario, according to an embodiment of the present technology.

FIG. 5 illustrates another example scenario supported by the subcarrier scan module 102, according to an embodiment of the present technology. According to the example scenario of FIG. 5, the subcarrier scan module 102 has performed one or more noise power calculations. Further, the subcarrier scan module 102 has displayed noise power overview plot 502 to a user. The noise power overview plot 502 includes multiple bars. A height of each bar indicates a normalized noise power level calculated for the subcarrier to which the bar corresponds. Within the noise power overview plot 502, all bars are set to a color which indicates that the subcarriers of the bars use a bit loading profile for carrying user data. According to the example scenario of FIG. 5, a cursor 504 has been moved to a bar by the user. In response, the subcarrier scan module 102 has used the user interface 500 to display various information 506 about the selected bar to the user.

Further according to the example scenario of FIG. 5, a 6 MHz-wide marker 508 has been used by the user to select a 6 MHz frequency range. In response, the subcarrier scan module 102 has displayed a noise power zoom plot 510 to the user. The noise power zoom plot 510 includes multiple bars. A height of each bar indicates a normalized noise power level calculated for the subcarrier of the bar. Within the noise power zoom plot 510, all bars are set to a color which indicates that the subcarriers of the bars use a bit loading profile for carrying user data. According to the example scenario of FIG. 5, a cursor 412 has been moved to a bar by the user. In response, the subcarrier scan module 102 has used the user interface 500 to display various information 414 about the selected bar to the user.

Figure 6:
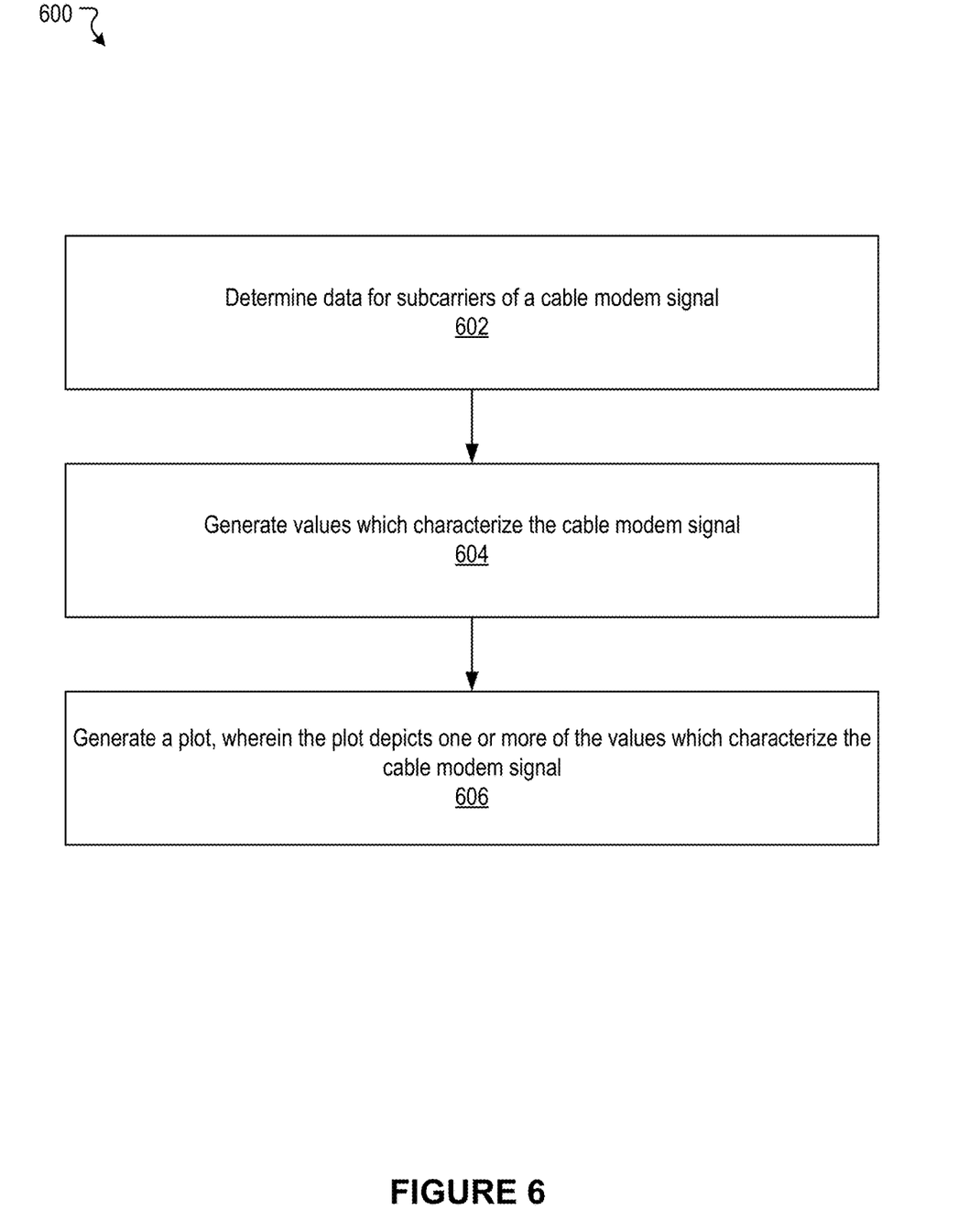
FIG. 6 illustrates an example process, according to an embodiment of the present technology.

FIG. 6 illustrates an example process 600, according to various embodiments of the present technology. It should be appreciated that there can be additional, fewer, or alternative steps performed in similar or alternative orders, or in parallel, within the scope of the various embodiments discussed herein unless otherwise stated.

At block 602, the example process 600 can determine data for subcarriers of a cable modem signal. At block 604, the process can generate values which characterize the cable modem signal. Then, at block 406, the process can generate a plot. The plot can depict one or more of the values which characterize the cable modem signal.

It is contemplated that there can be many other uses, applications, and/or variations associated with the various embodiments of the present technology. For example, various embodiments of the present technology can learn, improve, and/or be refined over time.

Hardware Implementation

Figure 7:
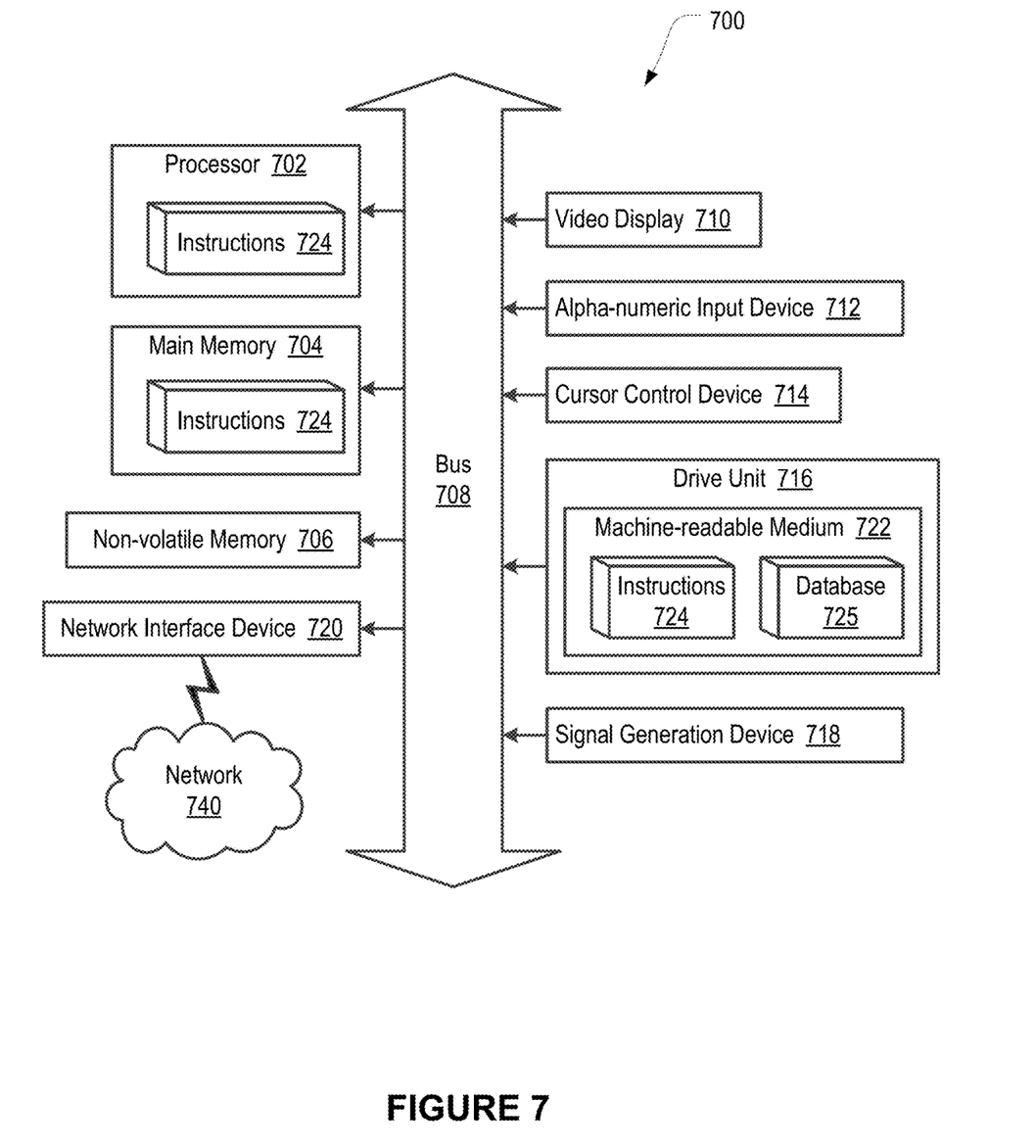
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions 724 for causing the computer system 700 to perform the processes and features discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a drive unit 716, a signal generation device 718 (e.g., a speaker) and a network interface device 720.

In one embodiment, the video display 710 includes a touch sensitive screen for user input. In one embodiment, the touch sensitive screen is used instead of a keyboard and mouse. The disk drive unit 716 includes a machine-readable medium 722 on which is stored one or more sets of instructions 724 (e.g., software) embodying any one or more of the methodologies or functions described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 722 also includes a database 725.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 700 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in both method and apparatus modes.

Further, each of the various elements of the invention and claims may also be achieved in a variety of manners. This technology should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
    receiving, by a computing system, a cable modem signal;
    determining, by the computing system, data for subcarriers of the cable modem signal, wherein the data for the subcarriers of the cable modem signal comprises one or more in-phase values and one or more quadrature values;
    generating, by the computing system, values which characterize the cable modem signal, wherein the generating the values which characterize the cable modem signal comprises generating one or more signal power values using the in-phase values and the quadrature values;
    receiving, by the computing system, a request for a plot to be displayed from a selection of plots, wherein the selection of plots includes at least a signal power overview plot, and wherein the signal power overview plot is based on the one or more signal power values; and
    generating, by the computing system, the plot to be displayed, wherein the plot depicts one or more of the values which characterize the cable modem signal as one or more bars, wherein each bar corresponds to a subcarrier of the cable modem signal.

2. The computer-implemented method of claim 1, wherein the cable modem signal is an orthogonal frequency-division multiplexing signal.

3. The computer-implemented method of claim 1, further comprising:
    receiving a request for a zoom plot, wherein the request for the zoom plot specifies a frequency range for the plot; and
    generating the zoom plot, wherein the zoom plot provides a zoom of the specified frequency range.

4. The computer-implemented method of claim 1, wherein the generating the values which characterize the cable modem signal comprises:
    generating one or more modulation error ratio values.

5. The computer-implemented method of claim 1, wherein the generating the values which characterize the cable modem signal comprises:
    generating one or more noise power values.

6. The computer-implemented method of claim 1, wherein
    each bar of the one or more bars corresponds to a 6 MHz block.

7. The computer-implemented method of claim 1, further comprising:
    setting the one or more bars to have one or more colors, wherein the one or more colors indicate bit loading profiles.

8. The computer-implemented method of claim 1, further comprising:
    determining a selection of one of the one or more bars; and
    displaying information regarding the selected bar.

9. The computer-implemented method of claim 1, wherein the selection of plots further includes a modulation error ratio overview plot and a noise power overview plot.

10. A system comprising:
- at least one processor; and
- a memory storing instructions that, when executed by the at least one processor, cause the system to perform:
- receiving a cable modem signal;
- determining data for subcarriers of the cable modem signal, wherein the data for the subcarriers of the cable modem signal comprises one or more in-phase values and one or more quadrature values;
- generating values which characterize the cable modem signal, wherein the generating the values which characterize the cable modem signal comprises generating one or more signal power values using the in-phase values and the quadrature values;
- receiving a request for a plot to be displayed from a selection of plots, wherein the selection of plots includes at least a signal power overview plot, and wherein the signal power overview plot is based on the one or more signal power values; and
- generating the plot to be displayed, wherein the plot depicts one or more of the values which characterize the cable modem signal as one or more bars, wherein each bar corresponds to a subcarrier of the cable modem signal.

11. The system of claim 10, wherein the instructions, when executed by the at least one processor, further cause the system to perform:
- receiving a request for a zoom plot, wherein the request for the zoom plot specifies a frequency range for the plot; and
- generating the zoom plot, wherein the zoom plot provides a zoom of the specified frequency range.

12. The system of claim 10, wherein the generating the values which characterize the cable modem signal comprises:
- generating one or more modulation error ratio values.

13. The system of claim 10, wherein the generating the values which characterize the cable modem signal comprises:
- generating one or more noise power values.

14. The system of claim 10, wherein the selection of plots further includes a modulation error ratio overview plot and a noise power overview plot.

15. A non-transitory computer-readable storage medium including instructions that, when executed by at least one processor of a computing system, cause the computing system to perform a method comprising:
- receiving a cable modem signal;
- determining data for subcarriers of the cable modem signal, wherein the data for the subcarriers of the cable modem signal comprises one or more in-phase values and one or more quadrature values;
- generating values which characterize the cable modem signal, wherein the generating the values which characterize the cable modem signal comprises generating one or more signal power values using the in-phase values and the quadrature values;
- receiving a request for a plot to be displayed from a selection of plots, wherein the selection of plots includes at least a signal power overview plot, and wherein the signal power overview plot is based on the one or more signal power values; and
- generating the plot to be displayed, wherein the plot depicts one or more of the values which characterize the cable modem signal as one or more bars, wherein each bar corresponds to a subcarrier of the cable modem signal.

16. The non-transitory computer-readable storage medium of claim 15, wherein the instructions, when executed by the at least one processor of the computing system, further cause the computing system to perform:
- receiving a request for a zoom plot, wherein the request for the zoom plot specifies a frequency range for the plot; and
- generating the zoom plot, wherein the zoom plot provides a zoom of the specified frequency range.

17. The non-transitory computer-readable storage medium of claim 15, wherein the generating the values which characterize the cable modem signal comprises:
- generating one or more modulation error ratio values.

18. The non-transitory computer-readable storage medium of claim 15, wherein the generating the values which characterize the cable modem signal comprises:
- generating one or more noise power values.

19. The non-transitory computer-readable storage medium of claim 15, wherein the selection of plots further includes a modulation error ratio overview plot and a noise power overview plot.

* * * * *